May 10, 1927.
E. M. COLE
1,627,955
ATTACHMENT FOR FERTILIZER DISTRIBUTORS
Filed Feb. 2, 1924
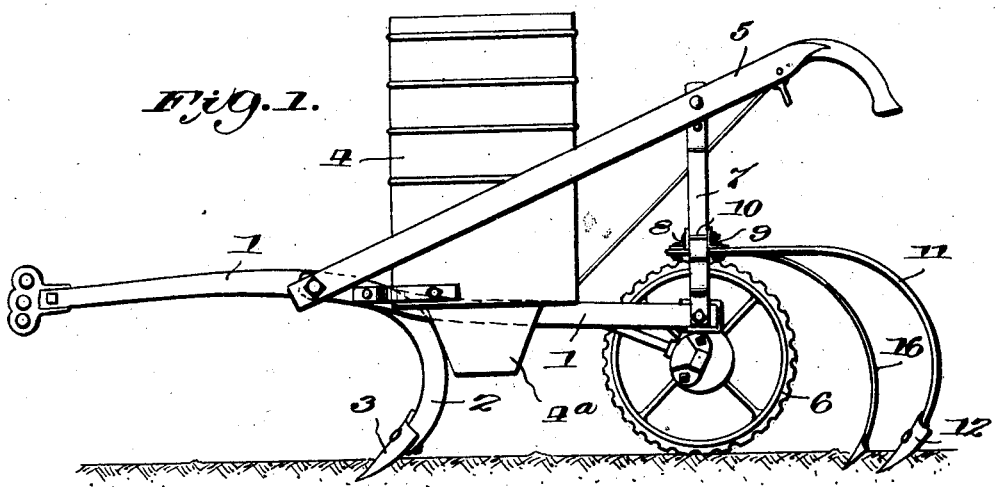
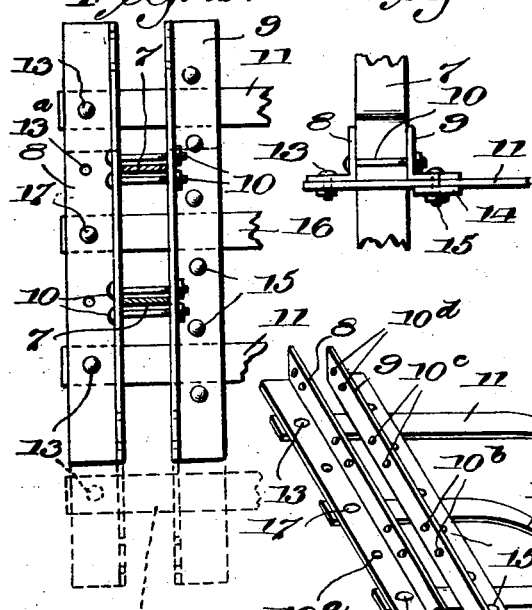
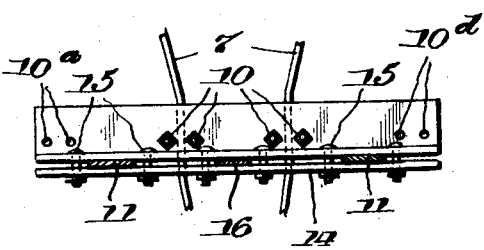
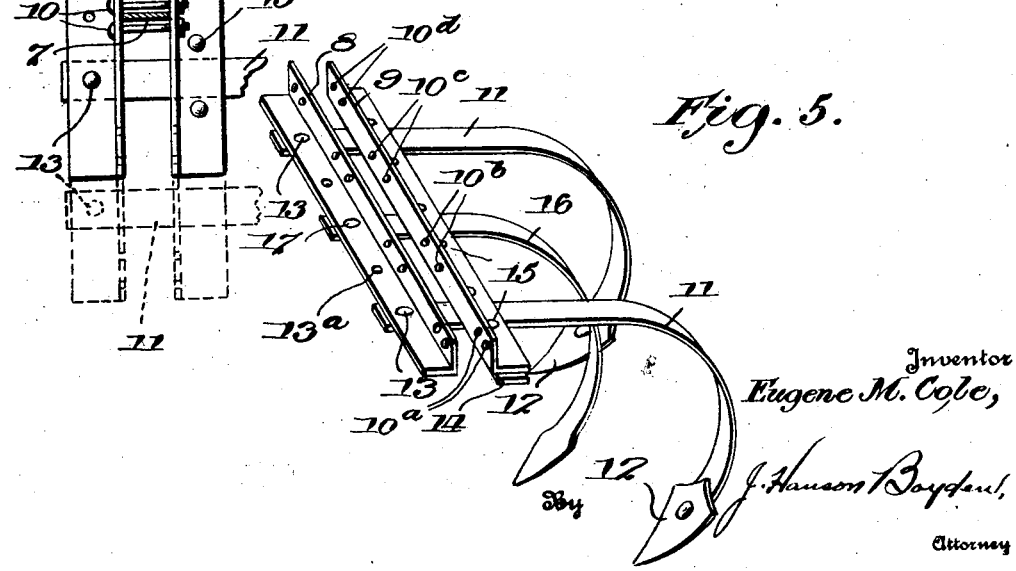
Inventor
Eugene M. Cole,
By J. Hanson Boyden,
Attorney Patented May 10, 1927.

1,627,955

UNITED STATES PATENT OFFICE.

EUGENE M. COLE, OF CHARLOTTE, NORTH CAROLINA.

ATTACHMENT FOR FERTILIZER DISTRIBUTORS.

Application filed February 2, 1924. Serial No. 690,181.

This invention relates to agricultural implements such as fertilizer distributors or the like, and more particularly to an attachment for such implements.

Fertilizer distributors of the single row type, as commonly used, comprise a frame, hopper and feeding mechanism, a furrow opener, a spout for depositing the fertilizer from the hopper into the furrow, and a ground wheel located at the rear of the spout.

It is often desirable to stir or mix the fertilizer with the soil in the furrow, to draw in the earth from each side, so as to fill the furrow and thoroughly cover the fertilizer, and also, sometimes, to fertilize and cultivate a growing crop at a single operation.

The general object of the present invention is to provide an attachment for fertilizer distributors of the above type, which shall be cheap and simple in construction, and which shall make possible a maximum variety of operations and adjustments with a minimum number of parts, the attachment comprising a plurality of plow shanks or teeth adapted to engage the ground behind the ground wheel, one of said teeth, if desired, running in the furrow to serve as a stirrer and one or more other teeth being disposed at the side or sides of the furrow and serving to draw the earth toward the same to form a ridge, or to cultivate a row of plants. More specifically, the invention seeks to devise such an attachment that may be secured to existing makes of distributors without in any way changing or modifying the same, and which may be vertically adjusted so as to cause the plow shanks or teeth to run at any desired depth, and transversely adjusted so as to properly perform the desired operation.

In order that the invention may be readily understood, reference is had to the accompanying drawing, forming part of this specification, and in which:—

Figure 1 is a side elevation of a fertilizer distributor, showing my attachment applied thereto;

Figure 2 is a fragmentary plan on an enlarged scale, showing the method of securing my improved attachment to the distributor frame, parts of such frame being illustrated in section;

Figure 3 is a side elevation of the parts shown in Figure 2;

Figure 4 is a rear elevation thereof, the plow shanks being shown in section; and Figure 5 is a perspective view of my improved attachment complete, ready to be applied to a distributor.

Referring to the drawings in detail, the fertilizer distributor which I have shown, by way of illustration, comprises the usual beam or frame 1, a plow shank 2, carrying a plow or shovel 3 to act as a furrow opener, a hopper 4 having a discharge spout 4ª arranged immediately behind the furrow opener, handle bars 5, and a ground wheel 6, such ground wheel serving to operate the dispensing or feeding mechanism in the hopper by means of suitable gearing.

In implements of the kind above described, there are usually provided a pair of brace rods 7, extending from the handle bars 5 to the rear end of the beam 1, such brace rods constituting part of the frame and usually being disposed substantially vertically, as shown in Figure 1. It is to these braces that my improved attachment is adapted to be secured.

The attachment itself comprises a pair of angle bars 8 and 9, extending substantially horizontally and transversely of the beam. These bars are secured together by means of two pairs of bolts 10, the arrangement being such that one of the braces 7 is received between each pair of bolts, as clearly shown in Figure 2, and the braces also lie between the bars 8 and 9. It will thus be seen that the frame comprising the bars 8 and 9, and associated parts, can be vertically adjusted on the braces 7, and, by tightening the bolts 10, may be clamped in any desired position. It will be particularly observed that this method of attachment obviates the necessity of boring any holes in or otherwise modifying the braces 7, the only tool necessary for attachment being an ordinary wrench.

Carried by the bars 8 and 9, are a plurality of plow shanks or teeth, three being shown. These teeth or shanks are preferably made of resilient strap steel, similar to the teeth of an ordinary spring tooth harrow. The upper ends of the two outer shanks 11 are pivotally connected to the bar 8, by means of bolts 13, and the upper end of the central shank 16 is pivotally connected to said bar by means of a bolt 17. It is therefore obvious that the shanks may be swung or angularly adjusted on their pivots, relative to the bars 8 and 9, and to each other.

In order to secure or lock the shanks in any desired angular relation, I provide a locking bar 14, as best shown in Figures 3 and 4. This bar is carried by and disposed immediately under the angle bar 9, being secured thereto by a series of bolts 15. Six of such bolts are shown, and are so arranged that one bolt is located on each side of each shank. The locking bar 14 lies underneath the shanks so that said shanks pass between the locking bar and angle bar 9, as clearly shown in Figure 4. It is thus obvious that by tightening up the bolts 15, the shanks 11 and 16 may be tightly gripped between the clamping bar 14 and the angle bar 9, and thus frictionally held in any position to which they may have been adjusted. In this way, the shoes or shovels 12, carried at the free ends of the shanks 11, may be set nearer or farther apart, as desired. Preferably the shank 16 does not carry a shoe or shovel, but is merely sharpened, as shown in Figure 5. This central shank may, of course, be omitted, if desired, without in any way affecting the other shanks or the attaching and adjusting means.

By reference to Figure 5, it will be seen that the upstanding flanges of the bars 8 and 9 are provided with a plurality of pairs of holes, 10ª, 10ᵇ, 10ᶜ and 10ᵈ, distributed along the length thereof, for the reception of the clamping bolts 10, above described. As shown in full lines in Figures 2 and 4, the clamping bolts occupy the two middle pairs of holes 10ᵇ and 10ᶜ, thus centering the bars 8 and 9, and the plow shanks carried thereby, relative to the beam and ground wheel of the implement. If, however, it be desired to set one or more of the plow shanks to run well to one side of the furrow or row, as in cultivating growing plants, the bolts 10 may be removed and the crossbars shifted endwise to such a position as indicated in dotted lines in Figure 2, when the bolts are then replaced in the holes 10ᶜ and 10ᵈ, thus securing the bars with one end projecting laterally beyond the wheel of the implement. One or more plow shanks may then be employed, secured to such projecting end, only of the cross bars, the other plow shanks being taken off, and in this connection, it will be noted that I provide a series of holes 13ª in the horizontal flange of the bar 8, through any of which the bolt 13, for attaching a plow shank, may be inserted. Thus, such plow shanks as are used in any given case may be mounted in any desired position, transversely of the line of draft, and may be set any desired distance apart, as well as angularly adjutsed.

What I claim is:—

1. An attachment for fertilizer distributors or the like, having a frame, and means for supporting the same at two points, handle bars, and braces connecting the frame and handle bars, said attachment comprising a cross bar, means for frictionally clamping said bar to said braces so that it will be supported thereby in a substantially horizontal position said frictional clamping means constituting the sole securing means for said bar, and one or more plow shanks having their ends attached to and carried by said cross bar.

2. An attachment for fertilizer distributors or the like, having a frame, handle bars, and braces connecting the frame and handle bars, said attachment comprising a cross bar, means for adjustably clamping said cross bar to said braces so that it will be supported wholly therey in a substantially horizontal position, and at any desired height, and one or more plow shanks having their forward ends attached to said cross bar adjacent the ends thereof.

3. An attachment for fertilizer distributors or the like having a frame, handle bars, and braces connecting the frame and handle bars, said attachment comprising a cross bar, means for clamping said bar to said braces so that it will be supported wholly thereby in a substantially horizontal position, a pair of plow shanks having their forward ends pivotally attached to said cross bar so that they can be angularly adjusted relative thereto and to each other, and means for clamping said plow shanks in different angular positions.

4. An attachment for fertilizer distributors or the like, having a pair of substantially vertical frame members, said attachment comprising a pair of separable cross bars, adapted to receive the frame members between them, means for clamping said cross bars to the frame members, a pair of plow shanks pivotally secured at their ends to one of said cross bars so that they may be angularly adjusted, and means carried by the other cross bar for clamping said shanks in different adjusted positions.

5. An attachment for fertilizer distributors or the like, having a pair of substantially vertical frame members, said attachment comprising a pair of separable cross bars, adapted to receive the frame members between them, means for clamping said cross bars to the frame members, a pair of plow shanks pivotally secured at their ends to one of said cross bars so that they may be angularly adjusted, a clamping bar in spaced parallel relation with the other cross bar and arranged to receive said plow shanks between itself and said cross bar, and bolts securing said clamping bar to said associated cross bar whereby said plow shanks can be frictionally held in any angular position to which they may be adjusted.

In testimony whereof I affix my signature.

EUGENE M. COLE.